INVENTORS
JOHN C. RICE
KENNETH THOMPSON
BY
Moses, Nolte & Nolte
ATTORNEYS

United States Patent Office 2,955,970
Patented Oct. 11, 1960

2,955,970

EXTRUSION COATING

John C. Rice, Tenafly, and Kenneth Thompson, Woodcliff, N.J., assignors to Lowe Paper Company, Ridgefield, N.J., a corporation of New Jersey Filed Oct. 25, 1957, Ser. No. 692,342

4 Claims. (Cl. 154—102)

This invention relates to a method for improving the bonding between polyolefins and hydrophilic topcoats. More particularly, this invention relates to the manufacture of laminated sheet material comprising a web substrate, an intermediate polyolefinic layer and a hydrophilic polar, non-polymerizing topcoat. One of the major problems in using polyethylene film and coatings is their lack of adhesion to other materials such as printing inks, adhesives, etc. It has been a practice in the past to treat the polyethylene surface with heat in order to make it more receptive to printing inks or adhesives. This process has certain drawbacks, namely, that the heat-treated surface has a tendency to lose its effectiveness on aging, and on frictional contact with other surfaces.

It has now been found that the disadvantages of the prior art methods may be overcome by (1) filming the topcoating solution on a surface, (2) subjecting the filmed solution to heat to evaporate water, and (3) simultaneously extrusion-coating a web backing with a polyolefin, and applying said heated and dried topcoat to the other side of the polyolefinic film.

It has further been found that the imperfections of the prior art products can be avoided and a uniform surface obtained, if, in connection with the process, the topcoat employed is a hydrophilic, polar, substantially non-polymerizing solution. Furthermore, said topcoats greatly lower the tendency of the film to build up a static charge, and improve the slip resistance of the material.

It is accordingly an object of this invention to provide a process for improving the bonding between polyolefinic materials and hydrophilic topcoats.

It is also an object of the present invention to provide an improved process for manufacturing laminated sheet material having a web backing, an intermediate polyolefinic layer, and a hydrophilic, polar, non-polymerizing topcoat.

It is a further object of this invention to provide a device for effecting the above objects.

Other and more detailed objects will be apparent from the following description, drawing and claims.

Any "backing" capable of being extrusion-coated with a polyolefin, and particularly polyethylene, is useful in the present invention. The backing, however, should be a suitable one for use in packaging. Among the suitable backing material may be mentioned kraft paper, boxboard substrates, cloth, foil, cellophane, etc. Of particular utility are the cellulosic backings, such as kraft paper and boxboard substrates.

As used herein, the term polyolefin refers to the polymeric resins formed through the homopolymerization of an aliphatic monoethylenic unsaturated hydrocarbon, or through the copolymerization of two or more such unsaturated hydrocarbons. The monomers from which the polyolefin is prepared are preferably the lower alkenes which are straight chain or branched chain. By way of illustration the following polyolefins may be mentioned: polyethylene, polypropylene, polyalphabutylene, polyisopropyl propylene, polyisopropyl butene, etc.

As mentioned above, the topcoats that are most suitable for the present invention are hydrophilic, polar and substantially non-polymerizing. As used herein, the term "substantially non-polymerizing" includes topcoating compositions which contain synthetic polymers such as styrene butadiene. Among the useful topcoat materials may be mentioned starch, carboxymethyl cellulose, proteins (e.g., gelatin, casein), polyvinyl alcohol, polyvinyl acetate, methocel, etc. One typical topcoat formula consists of a 10% solution of Penford Gum 260, which is a hydroxy ethyl ether derivative of cornstarch. A second topcoat formulation consists of soybean protein (or alternatively casein), which is dissolved with an excess of ammonium hydroxide in the presence of zinc sulphate. The composition is as follows:

| | Parts by weight |
|---|---|
| Protein | 100 |
| Water | 638 |
| Zinc sulphate | 5.12 |
| Ammonia (NH₄OH) (26° Bé.) | 26.50 |

Of particular interest are the pigmented topcoat compositions of the clay type. Examples of pigmented topcoat compositions which can be used in accordance with the present invention are given below. The numbers indicate the parts by weight.

| | A | B | C | D |
|---|---|---|---|---|
| Clay | 100 | 90 | 80 | 75 |
| Titanox | | 10 | | 10 |
| Calcium Carbonate | | | 20 | 15 |
| Casein | 15 | | 10 | |
| Starch | | 20 | | 15 |
| Styrene butadiene | | | 5 | 10 |
| Water | 170 | 80 | 130 | 90 |

These are all mixed in the conventional manner, which will be familiar to anyone skilled in the art. The solids content is maintained at about 45–55%, depending upon the viscosity desired. The coating weight can be varied from 2# per 1000 sq. ft. to 10# per 1000 sq. ft., depending on the desired results. This provides a well-anchored clay coating, which has extremely high smoothness because of the smooth polyethylene substrate, and which, in addition, provides a very ink-receptive surface.

A high gloss coating with excellent printability is obtained by brushing or buffing after application of the pigmented coating. A typical brushing operation is described in more detail below. After this brushing operation no further finishing is required.

In order to facilitate ready comprehension of this invention, and for a proper appreciation of the salient features thereof, the invention is illustrated in the accompanying drawing forming part thereof, and in which.

The following examples are further illustrative of the present invention, and it will be understood that the invention is not limited thereto:

Example I

Figure 1:
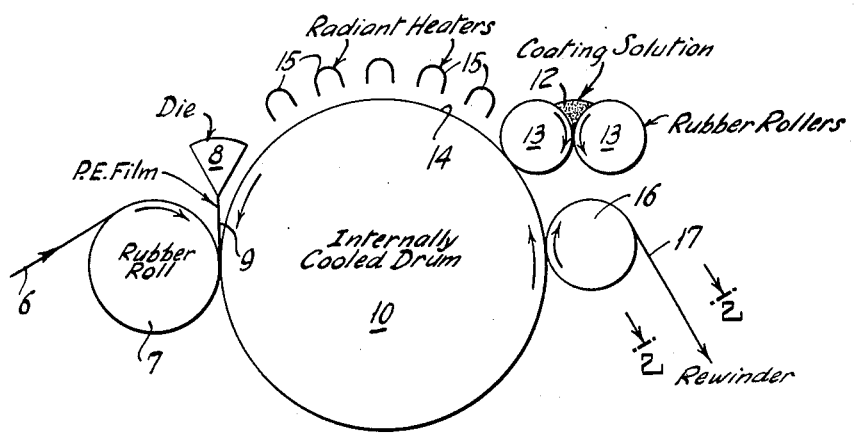
Figure 1 is a schematic sectional fragmentary view showing the apparatus involved in such coating operator.

In Figure 1, a web of kraft paper 6 is drawn from a reel (not shown) and is fed over a rubber faced roller 7 to a nip formed between the roller and cooling drum 10. The polyethylene is extruded through die 8 and is coated to the paper at the nip formed by drum 10 and rubber roller 7 by any standard extrusion-coating process common in the art. A coating solution 12, consisting of 100 parts by weight of clay, 15 parts by weight casein and 170 parts by weight of water, is fed by means of rubber rollers 13 to the upper portion, generally indicated at 14, of the internally cooled drum 10. This coating solution passes underneath radiant heaters 15 so that the water is evaporated from it. The exposure time required is about one second at a paper speed of 200 f.p.m. The coating is transferred directly to the hot extruded polyethylene film as it is being combined with the paper in the nip formed between the drum 10 and rubber roller 7. Paper, with the polyethylene film and the coating thereto attached, and designated generally by numeral 17 in the drawings, continues around drum 10 to rubber roller 16, where it is removed to a suitable take-up roller.

Figure 2:
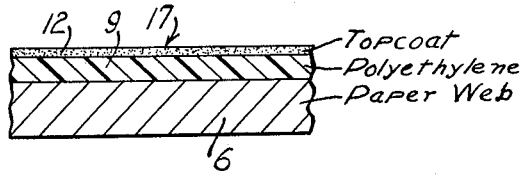
Figure 2 is a partial cross-sectional view taken along line 2—2 of Fig. 1 of the web backing to which has been applied a polyethylene intermediate coating and an overcoating composition.

The details of the nature of the coated paper 17 are shown in Fig. 2. Thus the paper web 6 is shown coated with an intermediate coating of polyethylene 9 which in turn is overcoated with a layer of topcoating composition 12.

*Example II*

The procedure described in Example I is followed, excepting that a 10% aqueous solution of Penford Gum 260 is employed as topcoat.

*Examples III*

The procedure of Example I is followed, excepting that the topcoating solution employed has the following composition:

| | Parts by weight |
|---|---|
| Clay | 90 |
| Titanox | 10 |
| Starch | 20 |
| Water | 80 |

*Example IV*

The procedure of Example I is followed, excepting that the topcoating solution employed is as follows:

| | Parts by weight |
|---|---|
| Clay | 80 |
| Calcium carbonate | 20 |
| Casein | 10 |
| Styrene butadiene | 5 |
| Water | 130 |

*Example V*

The procedure of Example I is followed, excepting that the topcoating solution employed is as follows:

| | Parts by weight |
|---|---|
| Clay | 75 |
| Titanox | 10 |
| Calcium carbonate | 15 |
| Starch | 15 |
| Styrene butadiene | 10 |
| Water | 90 |

*Example VI*

The procedure of Example I is followed, excepting that the topcoating solution employed is as follows:

| | Parts by weight |
|---|---|
| Soybean protein | 100 |
| Water | 638 |
| Zinc sulfate | 5.12 |
| Ammonia ($NH_4OH$) (26° Bé.) | 26.50 |

As noted above, a high gloss coating with excellent printability is obtained by brushing or buffing the coated sheet after the application of the topcoat, and particularly the pigmented topcoat. The following high speed brushing operation is used in connection with any of the procedures of the above examples.

The coated and dried paper web prepared by Example I is passed under a series of cylindrical brushes which rotate against the surface, using a backing behind the paper web for support. The brushes are approximately 12 inches in diameter and rotate within a speed range of 750–1500 r.p.m., with a paper speed of between 150 and 550 f.p.m. Normally, it is run at 300 f.p.m.

The brush bristles are approximately 1½" in length and are made of Tampico fiber. The brushes may be rotated in either direction; i.e., opposite the paper web, or with the paper web.

Seven brushes are employed in the present process; however, any number of brushes, from a minimum of two, may be used, depending upon the speed of the paper web. It is also possible to change the type of fiber used in the brush bristle to other materials, such as China bristle or nylon. However, the Tampico bristles are preferred.

A moistening spray or some other method of applying water, just prior to brushing, facilitates the finishing operation. We prefer to use a series of nozzles made by Sprayco, spaced about 6" apart, each of which ejects a fan-shaped stream of atomized water on the surface of the paper about 18" before the first brush. In this way the water serves as a plasticizer to soften and lubricate the coating so that a higher finish is obtainable.

While the invention has been described with particular reference to specific embodiments, it is to be understood that it is not limited thereto, but is to be construed broadly and restricted solely by the scope of the appended claims.

What is claimed is:

1. A method of affixing substantially non-polymerizing, polar hydrophilic adhesives to a freshly heated hydrophobic polyethylene surface which comprises feeding a paper web into a nip formed by a cooling drum and a rubber face backing pressure roller, leading to the same nip between the cooling drum and the paper web, a sheet of molten polyethylene material to form a polyethylene film and immediately applying a substantially non-polymerizing, polar hydrophilic adhesive to the polyethylene film so formed.

2. The method of treating a heated hydrophobic polyethylene surface comprising feeding a paper into a nip formed by a cooling drum and a rubber faced backing pressure roller, leading to the same nip, between the cooling drum and the paper, a sheet of molten polyethylene material and immediately depositing on the cooling drum a substantially non-polymerizing, polar hydrophilic adhesive in such a manner as to be carried into the same nip between the polyethylene film and the cooling drum so as to be directly applied to the polyethylene film.

3. The method of coating a polyethylene film with a hydrophilic adhesive as in claim 2, wherein the adhesive deposited on the drum is subjected to radiant heat before it is affixed to the polyethylene film.

4. A method of affixing a substantially non-polymerizing, polar hydrophilic topcoating composition to a freshly heated hydrophobic polyethylene surface which comprises feeding a paper web into a nip formed by a cooling drum and a rubber face backing pressure roller, leading to the same nip between the cooling drum and the paper web, a sheet of molten polyethylene material to form a polyethylene film and immediately applying a substantially non-polymerizing, polar hydrophilic topcoating composition to the polyethylene film so formed.

References Cited in the file of this patent

UNITED STATES PATENTS

| Re. 24,062 | Horton | Sept. 20, 1955 |
| 2,288,188 | Grupe | June 30, 1942 |
| 2,607,712 | Sturken | Aug. 19, 1952 |